United States Patent [19]

Yamashita et al.

[11] Patent Number: 4,604,707
[45] Date of Patent: Aug. 5, 1986

[54] DEVICE AND METHOD FOR COMPARING OPTICAL SIGNALS

[75] Inventors: Tsukasa Yamashita, Nara; Nobuhisa Inoue, Kyoto; Kazuhiko Mori, Osaka; Masaharu Matano, Kyoto, all of Japan

[73] Assignee: Omron Tateisi Electronics Co., Kyoto, Japan

[21] Appl. No.: 471,728

[22] Filed: Mar. 3, 1983

[30] Foreign Application Priority Data

Mar. 12, 1982 [JP] Japan .................................. 57-39683
Mar. 19, 1982 [JP] Japan .................................. 57-45449
Mar. 19, 1982 [JP] Japan .................................. 57-45450

[51] Int. Cl.$^4$ .............................................. G06G 9/00
[52] U.S. Cl. ................................... 364/822; 364/821; 364/713; 350/96.14; 350/358
[58] Field of Search ................ 364/807, 819, 821–822, 364/828, 713, 728, 732; 350/353, 358, 96.12, 96.13, 96.14

[56] References Cited

U.S. PATENT DOCUMENTS

| | | | |
|---|---|---|---|
| 3,655,261 | 4/1972 | Chang | 350/96 WG |
| 3,810,688 | 5/1974 | Ballman et al. | 350/96 WG |
| 3,874,782 | 4/1975 | Schmidt | 350/96 WG |
| 3,904,270 | 9/1975 | Cheo | 350/96 WG |
| 3,923,376 | 12/1975 | Martin | 350/96 WG |
| 4,000,937 | 1/1977 | Kaminow | 350/96 WG |
| 4,012,120 | 3/1977 | Kagiwada et al. | 364/822 X |
| 4,047,795 | 9/1977 | Hughes et al. | 350/96 C |
| 4,092,060 | 5/1978 | Nunoshita et al. | 350/96.13 |
| 4,124,280 | 11/1978 | Berg et al. | 350/358 |
| 4,128,300 | 12/1978 | Stotts et al. | 350/96.14 |
| 4,208,091 | 6/1980 | Cheo et al. | 350/96.13 |
| 4,217,036 | 8/1980 | Chang | 350/358 |
| 4,253,060 | 2/1981 | Chen | 324/77 K |
| 4,264,125 | 4/1981 | Shibata | 350/96.14 |
| 4,280,755 | 7/1981 | McNaney | 350/358 |
| 4,297,704 | 10/1981 | Marom et al. | 343/113 R |
| 4,364,633 | 12/1982 | Verber et al. | 350/96.14 |
| 4,415,226 | 11/1983 | Verber et al. | 350/96.14 |
| 4,439,016 | 3/1984 | Ogland et al. | 350/356 |
| 4,491,384 | 1/1985 | Yamashita et al. | 350/96.13 |

FOREIGN PATENT DOCUMENTS

56-155918 12/1981 Japan ................................. 350/96.14
821661 10/1959 United Kingdom .

OTHER PUBLICATIONS

"Fast Acousto-Optical Waveguide Modulators", Manhar L. Shah, *Applied Physics Letters*, vol. 23, No. 2, Jul. 1973.

"Programmable Optical Guided-Wave Device Using Bi$_{12}$SiO$_{20}$ Crystal", Hideki Hayashi, *IEEE Journal of Quantum Electronics*, vol. QE-14, No. 11, Nov. 1978, pp. 848-854.

(List continued on next page.)

Primary Examiner—Gary V. Harkcom
Attorney, Agent, or Firm—Cushman, Darby & Cushman

[57] ABSTRACT

An optical comparator for comparing, bit by bit, corresponding bits of two optical digital signals which are identical in the number of constituent optical bit signals, includes an optical waveguide layer made of an acousto-optical material. A surface acoustic wave generator generates a surface acoustic wave propagating on the waveguide layer, and a photocoupler directs the constituent bit signals to be of the two optical digital signals incident on the waveguide layer so as to satisfy the Bragg diffraction condition with respect to the surface acoustic wave propagating on the waveguide layer. A photosensor detects diffracted light and/or undiffracted light which has passed through a surface acoustic wave interaction region. The position of the generator and/or the surface acoustic wave generating timing is so determined that initiation or cessation of the interaction of the surface acoustic wave with a bit of one of the optical digital signals is simultaneous with initiation or cessation of the wave interaction with a corresponding bit of the other optical bit signal.

31 Claims, 13 Drawing Figures

OTHER PUBLICATIONS

"Temperature Stabilized Optical Waveguide Modulation", Makoto Minakata et al, *Review of the Electrical Communication Laboratories*, vol. 26, Nos. 9-10, Sep.-Oct. 1978, pp. 1139-1151.

"Electro-Optic Multiplexer for Large-Numerical Aperture, Low-Loss Fibers", Gravel et al, *Optics Letters*, vol. 1, No. 1, Jul. 1977.

"High-Performance Acousto-Optic Guided-Light Beam Device Using Two Tilting Surface Acoustic Waves", *Applied Physics Letters*, vol. 26, No. 4, pp. 140-142, Feb. 15, 1975, Tsai et al.

"Thermo-Optic Effect in $LiNbO_3$ For Light Deflection and Switching", by Haruna et al, *Electronics Letters*, 29th Oct. 1981, vol. 17, No. 22, pp. 842-844.

"A Frequency-Multiplexing Light Source with Monolithically Integrated Distributed-Feedback Diode Lasers", by A. Aiki et al, *IEEE Journal of Quantum Electronics*, vol. QE-13, No. 4, Apr. 1977.

Verber et al., "Correlator based on an Integrated Optical Spatial Light Modulator", *Applied Optics*, vol. 20, No. 9, May 1981, pp. 1626-1629.

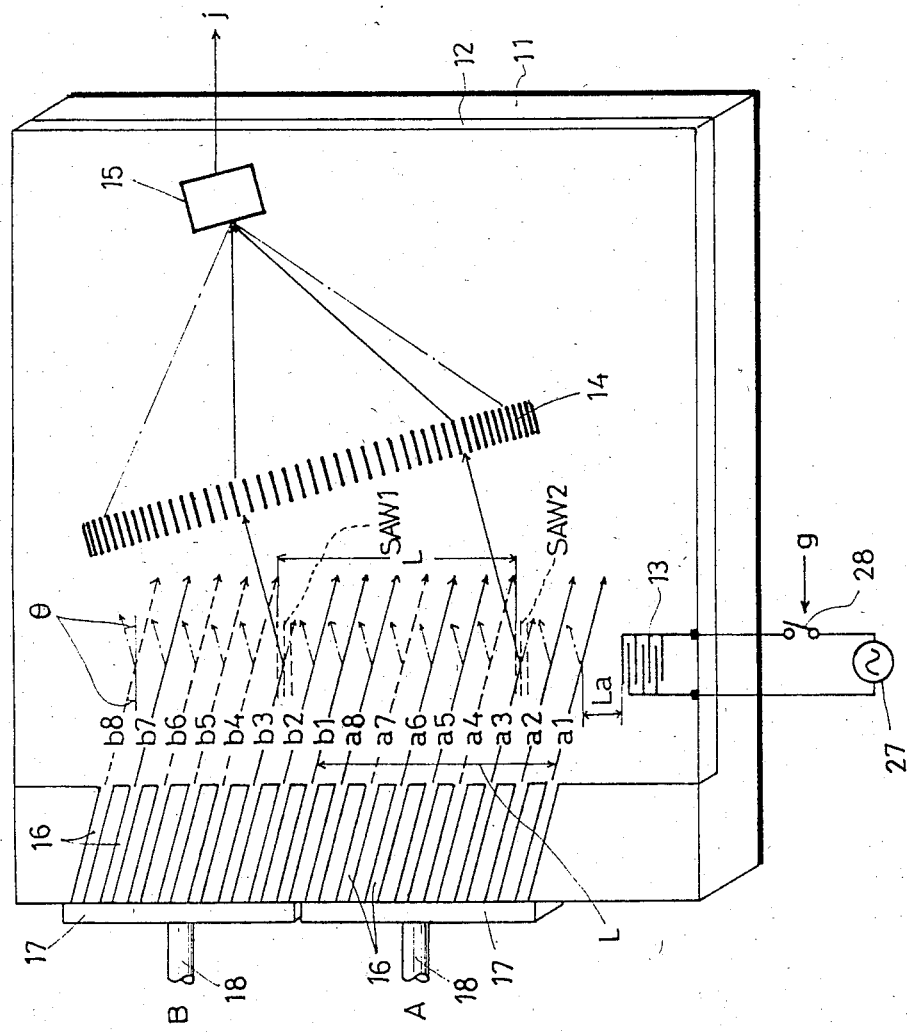

DEVICE AND METHOD FOR COMPARING OPTICAL SIGNALS

BACKGROUND OF THE INVENTION

The present invention relates to a device and a method by which two optical digital signals, identical in the number of constituent optical bit signals, are compared bit by bit without photo-electric conversion, and more particularly to an optical comparator and a method of comparing optical signals which utilize the Bragg diffraction of light by a surface acoustic wave.

With remarkable progress in light application techniques in recent years, there is a growing demand for various optical functional devices. Among other optical devices, optical comparators are basic devices for optical calculation, optical information processing, etc. Although greatly desired, such devices have not been actually implemented in practice.

SUMMARY OF THE INVENTION

The main object of the present invention is to provide an optical comparator and a method of comparing optical signals which are usable for the application of light.

The optical comparator of the invention is adapted to compare, bit by bit, two optical digital signals which are identical in the number of constituent optical bit signals. The optical comparator includes an optical waveguide layer made of an acousto-optical material. A surface acoustic wave generator generates a surface acoustic wave propagating on the optical waveguide layer, while means are provided for making the constituent optical bit signals of the two optical digital signals incident on the optical waveguide layer so as to satisfy the Bragg diffraction condition with respect to the surface acoustic wave propagating on the waveguide layer. A detector detects diffracted light and/or undiffracted light having passed through a surface acoustic wave interaction region. The position of the surface acoustic wave generator and/or the surface acoustic wave generating timing is controlled so that initiation or cessation of the interaction of the surface acoustic wave with one bit of the optical digital signals is simultaneous with initiation or cessation of the interaction of the surface acoustic wave with the corresponding bit of the other optical digital signal.

There are various modes of simultaneously initiating and/or ceasing the interaction of the surface acoustic wave with the two optical bit signals to be compared. The diffracted and/or undiffracted beams of the optical digital signals passing through the interaction region are detected also in various modes as to which beams are to be detected. For example, the optical bit signals to be compared with each other and included in the two optical digital signals may be diffracted by the surface acoustic wave at the same time to detect the diffracted light of one of the two optical digital signals and the undiffracted light of the other optical digital signal. When the optical bit signals to be compared have identical values in this case, the diffracted beam of one of the bit signals is complementary with the undiffracted beam of the other bit signal, such that the sum of these two bit signals has a constant value which remains unchanged with time. On the other hand, if the optical bit signals to be compared differ in value, a component which varies with time appears in the sum signal of the diffracted beam of one of the bit signals and the undiffracted beam of the other bit signal. This variation occurs upon diffraction of the optical signals. With an arrangement wherein the pairs of optical bit signals to be compared are diffracted at different times, a variation appearing in the output signal from the detecting means indicates that the pair of bit signals then compared do not match. For example when the output signal from the light detecting means is differentiated, the number of differentiation signals present indicates the number of pairs of bit signals do not match. In addition, in accordance with the time when a differentiation signal appears, the pair of bit signals which do not match can be identified.

Other modes will become apparent from the following description of embodiments.

The optical comparator of the present invention can be fabricated on a single substrate, is very simple in construction and can therefore be manufactured easily at a low cost in quantities. Since the comparator can be fabricated on a single chip along with other optical functional devices, it can be integrated on a substrate along with many devices.

BRIEF DESCRIPTION OF THE DRAWINGS

FIG. 11 is an elevated view in perspective of still another embodiment in accordance with the present invention.

DESCRIPTION OF THE PREFERRED EMBODIMENTS

Figure 1:
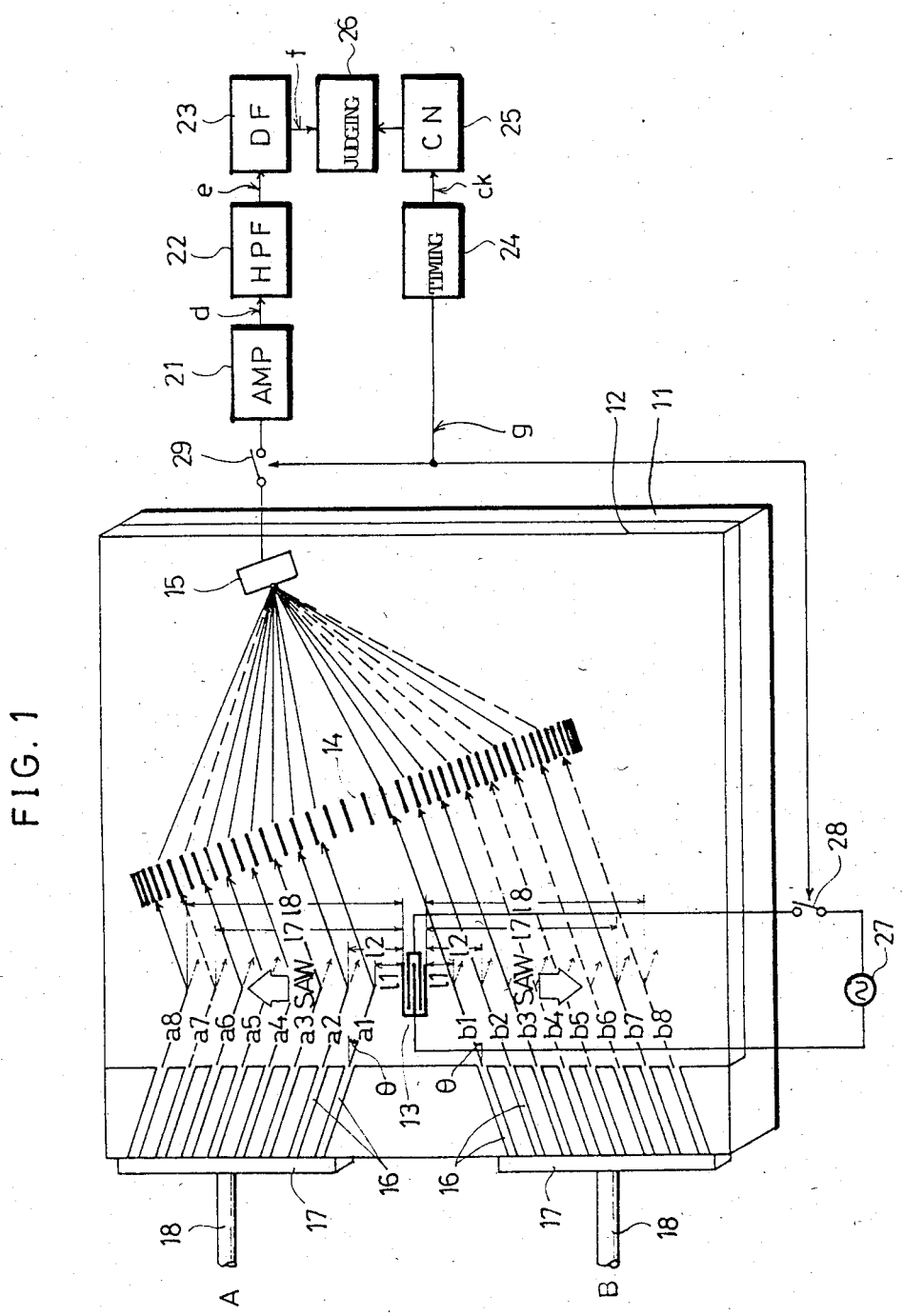
FIG. 1 is an elevated view in perspective of the presently preferred exemplary embodiment of an optical comparator in accordance with the present invention.

FIG. 1 is an elevated view in perspective of a first embodiment in accordance with the present invention. A substrate 11 comprising a single crystal of lithium niobate ($LiNbO_3$) (acousto-optical crystal) has an optical waveguide layer 12 formed thereon. Layer 12 may be formed on a surface of substrate 11 by thermally diffusing titanium at a temperature of about 1000° C. The layer is about several $\mu$m in thickness and has a refractive index higher than that of the substrate 11 by about $3-5\times10^{-3}$ in the preferred embodiment. The layer 12 is provided over the entire surface of substrate 11 except at the optical signal input side (at left in FIG. 1). Optical waveguide paths 16 for applying optical digital signals A and B to the waveguide layer 12 are provided on the substrate 11 at the input side. Eight waveguide paths 16 equidistantly spaced apart in parallel are formed for each of the signals A and B. The waveguide paths for the signal A and those for the signal B are directed toward the center of the waveguide layer 12 and are inclined at the Bragg angle φ with respect to a direction at right angles with the direction of propagation of the surface acoustic wave (hereinafter referred to as "SAW") to be described below. These waveguide paths 16 may be formed also by thermally diffusing titanium. A Gunn diode may also be used as a surface acoustic wave generator if desired.

In the preferred embodiment, the optical digital signals A and B are 8-bit optical signals. The constituent optical bit signals are represented by a1, a2, . . . a8, and b1, b2, . . . b8, respectively. It is assumed that the data represented by the signal A is 11111101 and that the data represented by the signal B is 11100010 (i.e. bits a1 and b1 are the most significant bits). A bit volume of 1 indicates presence of light and is shown in a solid line in FIG. 1. A bit having a zero value indicating absence of light and is shown in broken line. The optical digital signals A and B are fed from optical fibers 18 to the waveguide paths 16 via optical couplers 17 (optical coupling means). Coupler 17 can comprise any suitable optical coupling elements, such as grating or prism couplers.

An interdigital transducer (hereinafter referred to as "IDT") 13 generates SAW's for diffracting the optical bit signals a1 to a8 and b1 to b8 constituting the signals A and B respectively. A high-frequency signal generator 27 applies a high-frequency voltage signal to the IDT 13, which in turn generates SAW's propagating in two directions across the paths of propagation of the signals A and B. Since the SAW acts as a grating for diffracting light, the light incident on the SAW at the small angle $\theta$ is completely reflected by the SAW and deflected through $2\theta$ when satisfying the following condition:

$$\sin \theta = (\lambda/2) \cdot (1/\Lambda) \quad (1)$$

(where $\lambda$ is the wavelength of light and $\Lambda$ is the period of the SAW). Thus, deflection of light by the Bragg diffraction utilizing the SAW occurs.

It is assumed that the velocity of propagation of the SAW is VS and that the distances from an end of the IDT 13 to the positions (points of diffraction) where the beams a1 to a8 or b1 to b8 are diffracted by the SAW are l1 to l8. With the present embodiment, $l1 = (l2 - l1) = \ldots = (l8 - l7)$, and l1 is for example 100 μm. A switch 28 is turned on at time t0, causing the IDT 13 to generate SAW's. A period of time l1/VS thereafter, the SAW's start to diffract the beams a1 and b1 at the same time. At this time, the other beams a2 to a8 and b2 to b8 are travelling straight along their respective paths without being diffracted. Upon lapse of periods of time l2/VS, . . . l7/VS after time t0, the beams a2 and b2, . . . , a7 and b7 are diffracted respectively in succession. Finally, upon lapse of time l8/VS after t0, the beams a8 and b8 are diffracted at the same time.

Figure 2:
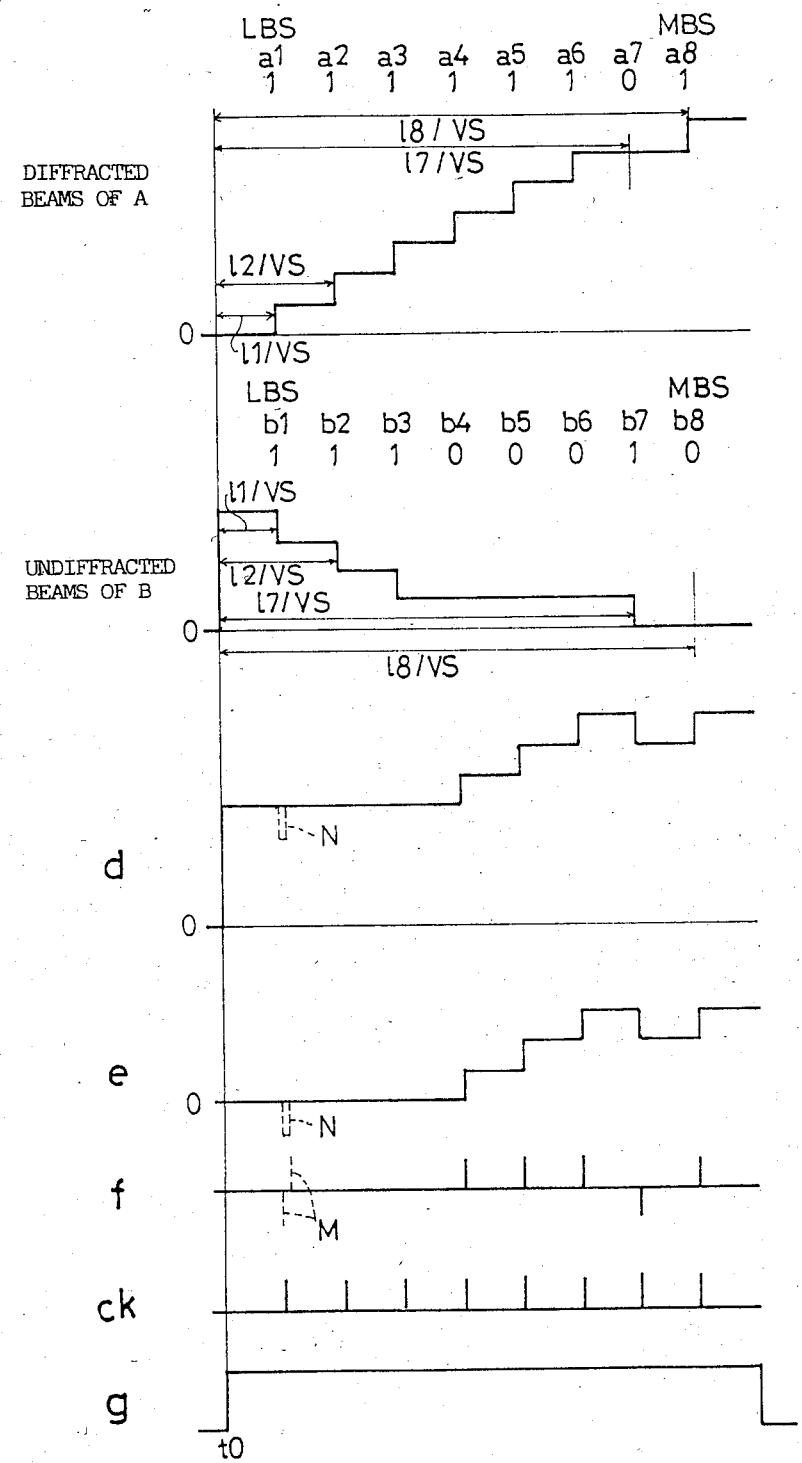
FIG. 2 is a timing diagram of signals produced by the optical comparator shown in FIG. 1.

A grating lens 14 (beam converging means) provided on the waveguide layer 12 is adapted to converge the parallel diffracted beams of the optical digital signal A and the parallel undiffracted beams of the optical digital signal B (which beams are shown in solid or broken lines). Other lenses are also usable as the beam converging means. The beams may be converged on the waveguide layer 12 as shown in FIG. 1, or the beams emitted by the layer 12 may be converged by an external converging means. The converged beams are then detected and converted to an electric signal by a photosensor 15, which may be provided on the waveguide layer 12 or outside of the layer 12. FIG. 2 shows the diffracted beams of the signal A and the undiffracted beams of the signal B detected by photosensor 15.

The output from the sensor 15 is fed through a switch 29 to an amplifier 21 and amplified to produce a signal d, which, like the output of the sensor 15, results from the addition or superposition of the diffracted beams of the signal A and the undiffracted beams of the signal B. The corresponding bits of the signals A and B are compared during the period of time from the time when the first beams a1 and b1 are diffracted after the SAW's are generated until the time when the last beams a8 and b8 are diffracted. A timing circuit 24 emits a control signal g for controlling the switches 28 and 29 in order to control the period of time in which the optical comparator operates and to derive signals only during the time period. The switches 28 and 29 are both closed at time t0 and opened upon the lapse of time l8/VS+α. α is a desired short period of time.

The optical bit signals ai and bi (i=1 to 8) to be compared with each other and included in the two optical digital signals A and B are diffracted by the SAW's at the same time. Accordingly the signals ai and bi represent the same place bit of signals A and B respectively (e.g. a1 and b1, a2 and b2, and a3 and b3). The diffracted beam of the signal ai and the undiffracted beam of the signal bi is alternatively fed to the sensor 15. For example, when one beam (e.g. beam bi) starts to impinge on the sensor 15, the other beam (e.g. beam ai) ceases to impinge thereon. As a result, the sum of these signals, i.e., the signal d, has a constant value which remains unchanged with respect to time whenever ai=bi (e.g. in the case of a1 and b1, a2 and b2, and a3 and b3). On the other hand, if the signals ai and bi to be compared with each other have different values (e.g. a4 and b4, a5 and b5, a6 and b6, a7 and b7, and a8 and b8), the signal varies between logic level 0 and logic level 1 upon the diffraction of each of these signals ai and bi. This variation can be detected by differentiating the signal d.

The signal d is fed to a high-pass filter 22, which removes the d.c. component to give a signal e, which in turn is differentiated by a differentiation circuit 23. A pulse appears in the differentiated signal f if the signals ai and bi do not match. The pulse is positive when ai>bi and negative when ai<bi. The timing circuit 24 emits a clock pulse in synchronism with the time when each pair of signals ai and bi are diffracted. The clock pulse, ck, is fed to a counter 25 which counts the number of pulses produced. A judging circuit 26 reads the value of the counter 25 upon the appearance of a pulse in the differentiated signal to determine the bit positions of signals ai and bi not matching.

While the optical waveguide layer is formed by thermally diffusing Ti through LiNbO$_3$ in the foregoing embodiment, such a waveguide layer can be prepared from other acousto-optical material by some other method.

Figure 3:
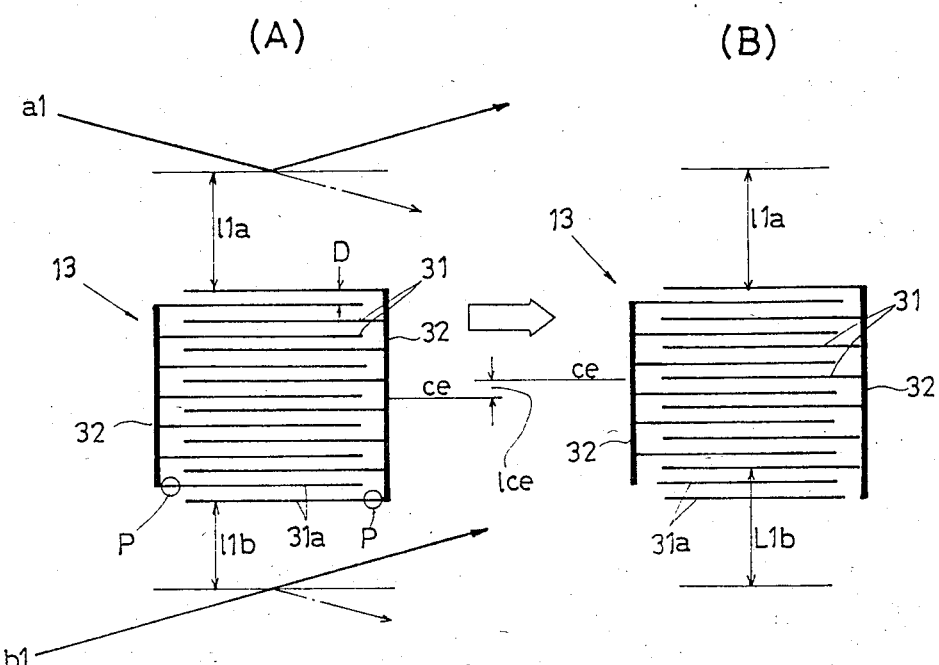
FIGS. 3(A), 3(B), 4(A) and 4(B) show schematically different methods of adjusting the interdigital transducer shown in FIG. 1.

In the optical comparator according to the above embodiment, it is very critical that the beams ai and bi be diffracted at exactly the same time. To assure this, the distance from one end of the IDT 13 to the point of diffraction of the beam ai is made equal to the distance from the other end of the IDT 13 to the point of diffraction of the beam bi. These distances are represented by li in FIG. 1. However, if the distance 11a from one end of the IDT 13 to the point of diffraction of the beam a1 differs from the distance 11b from the other end of the IDT 13 to the point of diffraction b1 (11a>11b) as shown in FIG. 3 (A), a negative pulse N appears in the signals d and e even if a1=b1, and pulses M in the signal f are erroneously produced as indicated in broken lines in FIG. 2. When the distances 11a and 11b are different, the other beams ai and bi (i≧2) are diffracted also at slightly different times, so that pulses N and M also appear in the case of the other beams. It will readily be understood that positive pulses will appear in the signals d and e if 11a<11b. If the optical signals to be compared are diffracted with different timings, the output signal has an impaired S/N ratio, with the likelihood that the result of comparison will involve an error.

Such a difference between the distances 11a and 11b is attributable partly to an error involved in the preparation of IDT 13. The optical waveguide paths 16 are formed by the thermal diffusion of Ti as already stated, and the IDT 13 is formed, for example, photolithographically, typically through the use of masks. It is extremely difficult to accurately position the mask for preparing the waveguide paths 16 and the mask for preparing the IDT 13 with a reduced error of up to several μm. However, even if the positioning of the IDT 13 involves an error, the error can be corrected by the following method to render the distance 11a accurately equal to the distance 11b.

As seen on an enlarged scale in FIG. 3, the IDT 13 comprises a large number of parallel linear electrodes 31 and two common electrodes 32a and 32b. Alternate ones of the linear electrodes are connected to the common electrodes 32a in the preferred embodiment (and likewise, the ones of the linear electrodes not connected to electrode 32a are connected to electrode 32b). The spacing, i.e., pitch D, of the linear electrodes 31 is $\Lambda/2$. When the distances 11a and 11b are different, some linear electrodes 31 positioned at one end of the IDT are cut off from the common electrodes as indicated at P, for example, by a laser to minimize the difference 11a−11b. When n linear electrodes 31 are cut off, the position of the end of the IDT 13 is corrected by the distance of $n\cdot\Lambda/2$. This shifts the center ce of the IDT 13 by $lce = n\cdot\Lambda/4$. For example, if 11a−11b=4.6 μm and $\Lambda$=4 μm, two linear electrodes 31a are cut off from the common electrodes as shown in FIG. 3 (A) to increase 11b by 4 μm. Consequently the difference between the corrected distance L1b and the distance 11a is as small as 0.6 μm as shown in FIG. 3 (B). The cut-off electrodes 31a, which do not participate in the generation of SAW's, will produce no adverse effect if left on the waveguide layer. Of course, the electrodes 31a can be removed entirely if desired.

Figure 4:
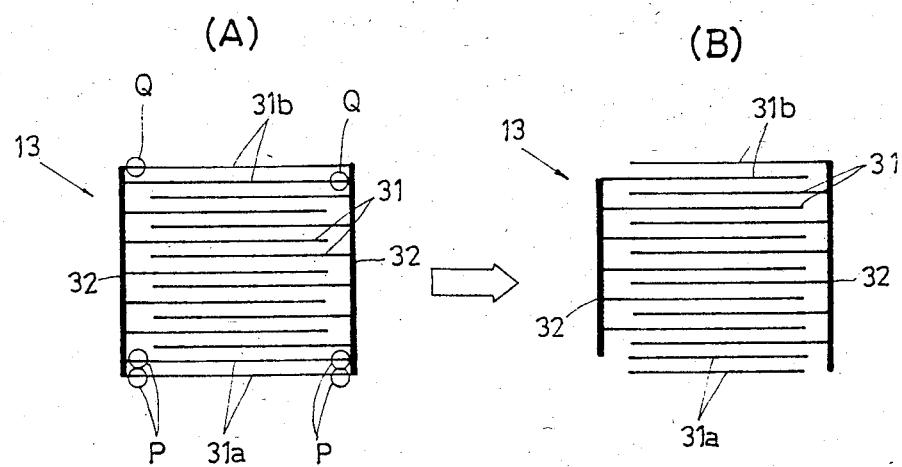

FIG. 4 shows another example of how IDT 13 can be modified. With reference to FIG. 4 (A), an IDT 13 has some linear electrodes 31a and 31b positioned at its opposite ends and each connected at opposite ends to common electrodes 32a and 32b. In accordance with the amount of position adjustment and orientation, some linear electrodes are cut off, each at one end only, from one of the common electrodes 32a and 32b, while the other linear electrodes are cut off at opposite ends from both common electrodes 32a and 32b. For example, electrodes 31b are cut off, each at one end only, from the electrodes 32a and 32b as indicated at Q to be connected to the common electrodes 32a and 32b alternately like the other linear electrodes 31, while the electrodes 31a are cut off at opposite ends from both the common electrodes 32a and 32b. FIG. 4 (B) shows the IDT 13 finally obtained. Although it is desirable that the IDT thus obtained have an odd number of linear electrodes which participate in the generation of SAW's, no objection will result even when the IDT includes an even number of linear electrodes.

Figure 5:
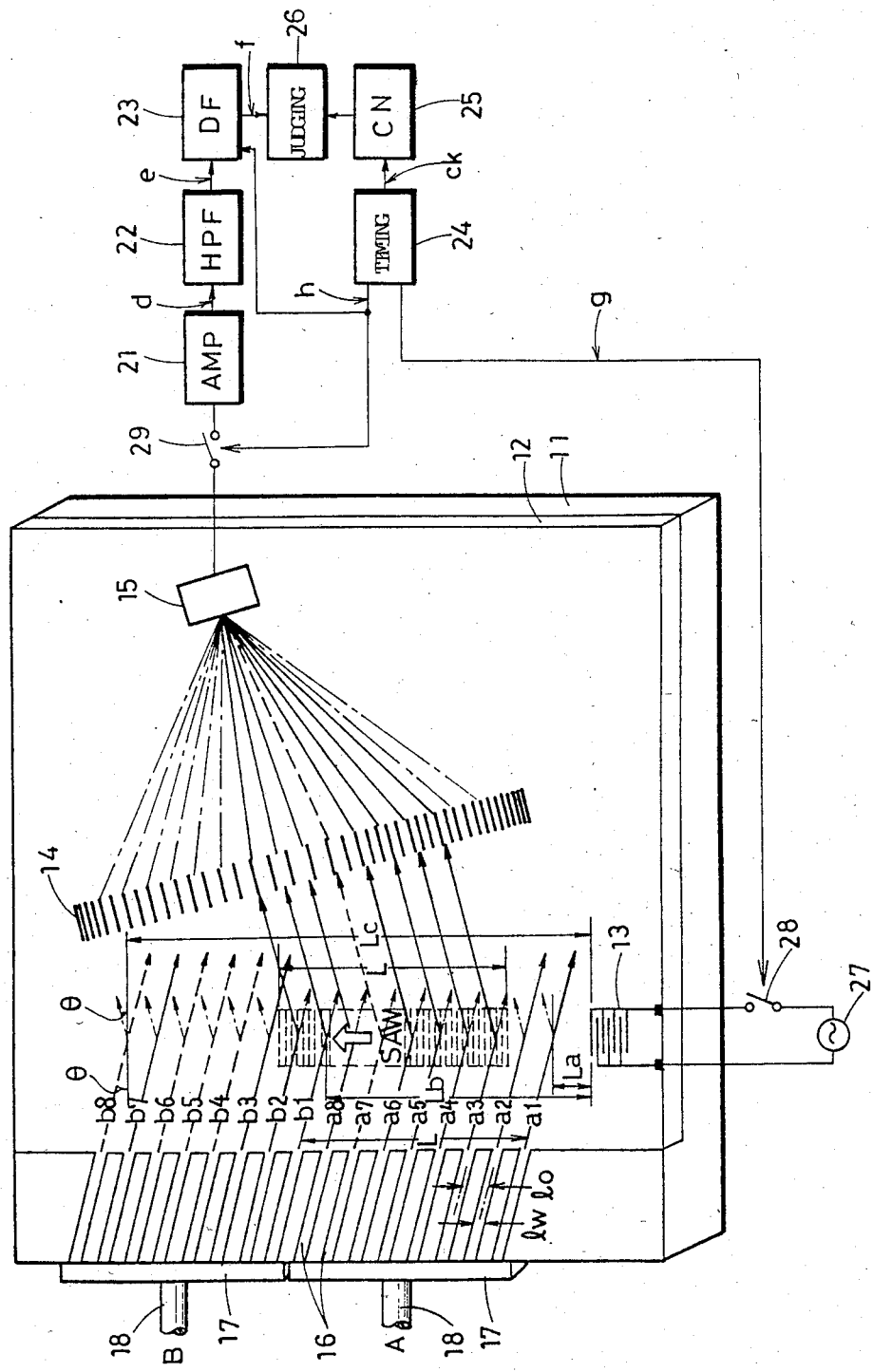
FIG. 5 is an elevated view in perspective of another embodiment of an optical comparator in accordance with the present invention.
Figure 6:
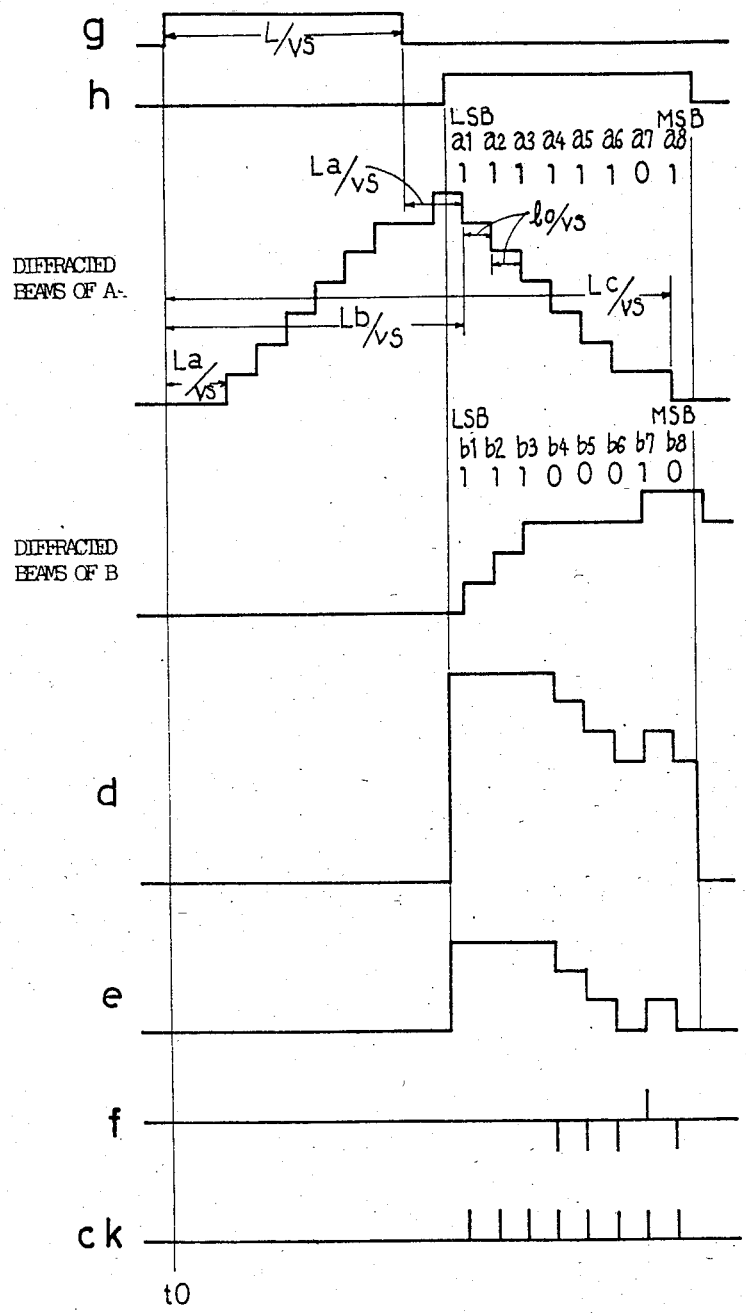
FIG. 6 is a timing diagram of signals produced by the optical comparator shown in FIG. 5.

FIGS. 5 and 6 show another embodiment of the present invention. Optical waveguide paths 16 for feeding optical digital signals A and B to an optical waveguide layer 12 are equidistantly formed in parallel, eight paths for each of the signals A and B. These waveguide paths 16 are inclined at the Bragg angle $\theta$ with respect to a direction at right angles to the direction of propagation of a SAW. It is assumed that the width of each waveguide path 16 is lw and that the spacing between two adjacent paths 16, i.e., the center-to-center distance between the two paths 16, is lo. All the waveguide paths 16 are identical in respect of the width lw and the distance lo. For example, lo is 100 μm.

An IDT 13 for generating the SAW is positioned laterally away from the optical paths for the constituent optical bit signals of the signals A and B. The distances from the forward end of the IDT 13 to the positions (points of diffraction) where the beams a1, b1 and b8 are diffracted by the SAW are La, Lb and Lc. Thus, $Lb = 8lo + La$, and $Lc = 7lo + Lb$. With reference to FIG. 6, a switch 28 is turned on at time t0, causing the IDT 13 to generte a SAW. A period of time La/VS thereafter, the SAW starts to diffract the beam a1. At this time, the other beams a2 to a8 and b1 to b8 are still travelling straight without being diffracted. Upon the lapse of periods of time (La+lo)/VS, (La+2lo)/VS, . . . , (La+14lo)/VS after t0, the SAW starts to diffract the beams a2, a3, . . . , b7 respectively in succession. Finally, upon lapse of time $Lc/VS = (La + 15lo)/VS$, the SAW starts to diffract the beam b8.

Further upon lapse of $8lo/VS = L/VS$ (assuming 8lo is L) after time t0, the switch 28 is turned off to discontinue the generation of the SAW. The length of the SAW from leading end to rear end is L. Accordingly upon the lapse of time (La+L)/VS after time t0, the SAW has passed over the point of diffraction of the beam a1 by the SAW, so that the beam a1 ceases to be diffracted at this time and therefore remains undiffracted. The time when the beam a1 ceases to be diffracted coincides with the time when the SAW starts to diffract the beam b1. Similarly upon the lapse of time {La+L+(i−1)·lo}/VS after time t0, the beam ai becomes an undiffracted beam, and the beam bi becomes a diffracted beam at the same time (i=2 to 8). Thus the constituent optical bit signals ai and bi (i=1 to 8) to be compared with each other of the two optical digital signals A and B are made undiffracted (ai) and diffracted (bi) by the SAW simultaneously, so that the result of comparison of the signals can be obtained exactly in the same manner as in the foregoing embodiment.

The comparator includes a timing circuit 24 which emits signals g and h for controlling the switches 28 and 29. As already stated, the switch 28 is turned on at time t0 and turned off upon the lapse of time L/VS thereafter. The switch 29 is turned on upon the lapse of time Lb/VS−α after time t0 and turned off upon the lapse of time Lc/VS+α after time t0. The signal h for controlling the switch 29 is given also to a differentiation circuit 23, which operates only while the signal h is given thereto. Since the operating time of the differentiation circuit 23 is controlled by the signal h, the switch 29 need not always be on-off controlled by the signal h but may be held on at all times.

Insofar as the spacing lo of the waveguide paths 16 is made equal for all the paths with this embodiment, the position of the IDT 13, i.e., the distance La, can be chosen as desired, and need not be accurately specified. It is relatively easy to form all the waveguide paths 16 at the constant spacing of lo. However, extreme difficulty is encountered in positioning the IDT 13 accurately relative to the optical waveguide paths 16, i.e., in providing the distance La accurately with a reduced error of the order of $\mu$m as already stated. With the present embodiment, the time when the beam ai becomes an undiffracted beam can be made to coincide with the time when the beam bi becomes a diffracted beam, provided that only the duration of generation of the SAW, which is relatively easy to control, is accurately controlled even if the distance involves some error. The optical comparator of this embodiment therefore operates at a high S/N ratio free of comparison errors.

Figure 7:
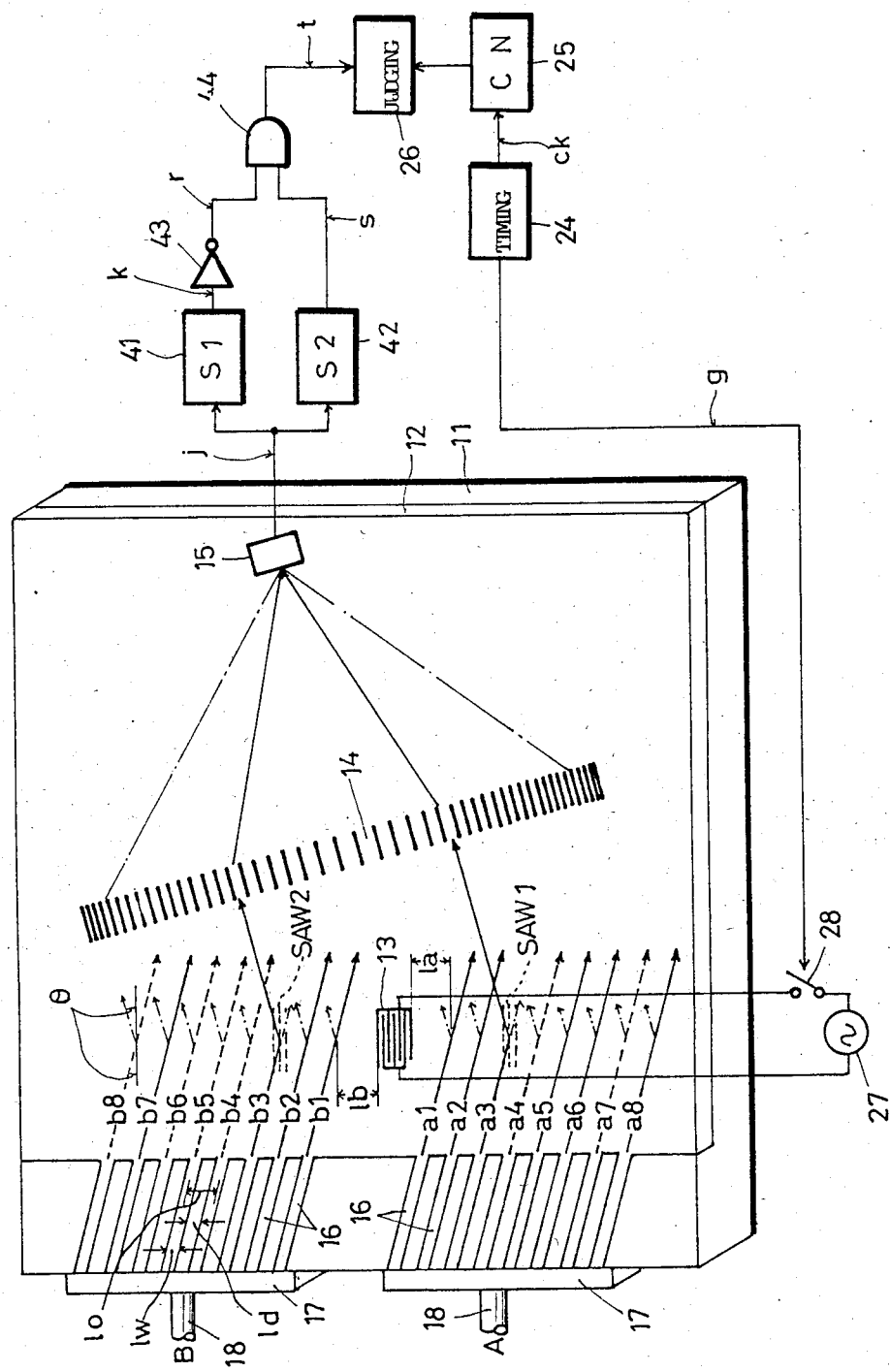
FIG. 7 is an elevated view in perspective of yet another embodiment of an optical comparator in accordance with the invention.
Figure 8:
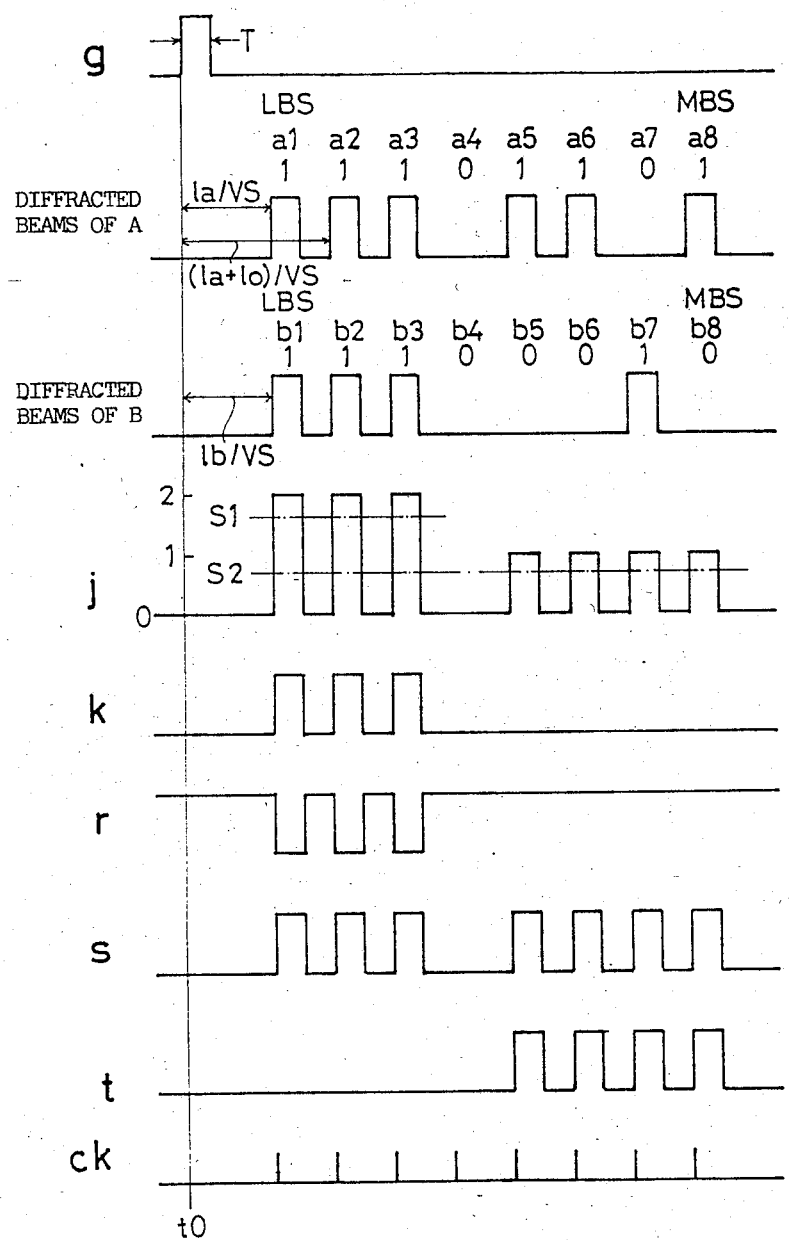
FIG. 8 is a timing diagram of signals produced by the comparator shown in FIG. 7.

FIGS. 7 and 8 show another embodiment of the present invention. With reference to FIG. 7, optical waveguide paths 16 for an optical digital signals A are in parallel with but spaced a distance away from those for an optical digital signals B to provide a space for disposing an IDT 13. The spacing between the adjacent optical waveguide paths 16 is ld, where $lo = lw + ld$. With this embodiment, the data represented by the signal A is 11101101, while the data represented by the signal B is 11100010.

The IDT 13 is disposed between the path of propagation of the digital signal A and that of the signal B. A high-frequency signal generator 27 applies a high-frequency frequency voltage pulse signal having a pulse width of T to the IDT 13. The IDT 13 generates pulsating SAW 1 and SAW 2 propagating in two directions toward the paths of propagation of the signals A and B. The distances from opposite ends of the IDT 13 to the positions (points of diffraction) where the beams a1 and b1 are deflected by the SAW's are assumed to be la and lb, which are equal. With reference to FIG. 8, a switch 28 is on for a period of time T after time t0, causing the IDT 13 to generate pulsating SAW's 1 and 2. Upon the lapse of time la/VS (=lb/VS), the beams a1 and b1 are diffracted at the same time. At this time, the other beams a2 to a8 and b2 to b8 are travelling straight without being diffracted. The SAW's 1 and 2 are pulsating and have a width of T·VS from front end to rear end. The pulse width T is so determined that the width T·VS is smaller than the spacing ld of the optical waveguide paths 16. Accordingly the SAW 1, while interacting with the beam a1, does not interact with the other beams a2 to a8, in particular with the beam a2. The relation of the SAW 2 with the beam b1 and the other beams is exactly the same as the above. The beams a1 and b1 are diffracted by the SAW's 1 and 2, respectively, for a period of time T (more precisely, for lw/VS+T, assuming that the beams a1 and b1 have a width lw) and thereafter cease being diffracted. Next, upon the lapse of time (la+lo)/VS after time t0, the beams a2 and b2 only are simultaneously diffracted by the SAW's for the above-mentioned period time. Thus upon the lapse of time $\{la + (i-1) \cdot lo\}/VS$ after time t0, the beams ai and bi (i=1 to 8) only are diffracted simultaneously by the SAW's 1 and 2 for the constant period of time.

A grating lens 14 converges the diffracted light of the optical digital signals A and B. The converged light is then detected and converted to an electric signal. The output j of the sensor 15 represents the sum of the diffracted beams of the signals A and B.

The optical bit signals ai and bi (i=1 to 8) to be compared with one another and included in the two optical digital signals A and B are diffracted by the SAW's at the same time. Accordingly, when the signals ai and bi represent the same value (for example, a1 and b1, a2 and b2, a3 and b3, and a4 and b4) and if the two signals have the same brightness, the signal j is at twice the level of each optical signal (level 2, when ai and bi are both 1), or at zero level (level 0, when both ai and bi are 0). On the other hand, when the signals ai and bi to be compared represent different values (e.g. a5 and b5, a6 and b6, a7 and b7, and a8 and b8), the signal j is at the level of one optical signal, i.e., level 1. A level discriminating circuit 41 is set at a reference level S1 which is slightly lower than the level 2 and emits a signal k having an H level when the input signal j is above the level S1. The signal k is inverted by a NOT circuit 43 to a signal r. A discriminating circuit 42 has a reference level S2 which is slightly lower than the level 1 and gives a signal s having an H level when the input signal j is above the level S2. The signal s is sent to an AND gate 44. Since the gate 44 is controlled by the signal r, the circuit 44 emits a signal t composed of pulses representing the level 1 components only of the signal j. The signal t is fed to a judging circuit 26.

A timing circuit 24 emits at time t0 a pulse signal g having a pulse width T to control the switch 28 and also emits a clock pulse ck in synchronism with the time when each pair of signals ai and bi is diffracted. The clock pulse ck is fed to a counter 25 and counted up. The judging circuit 26 reads the count on the counter 25 upon the appearance of a pulse in the signal t to recognize the bit position of the signals ai and bi which do not match.

Figure 9:
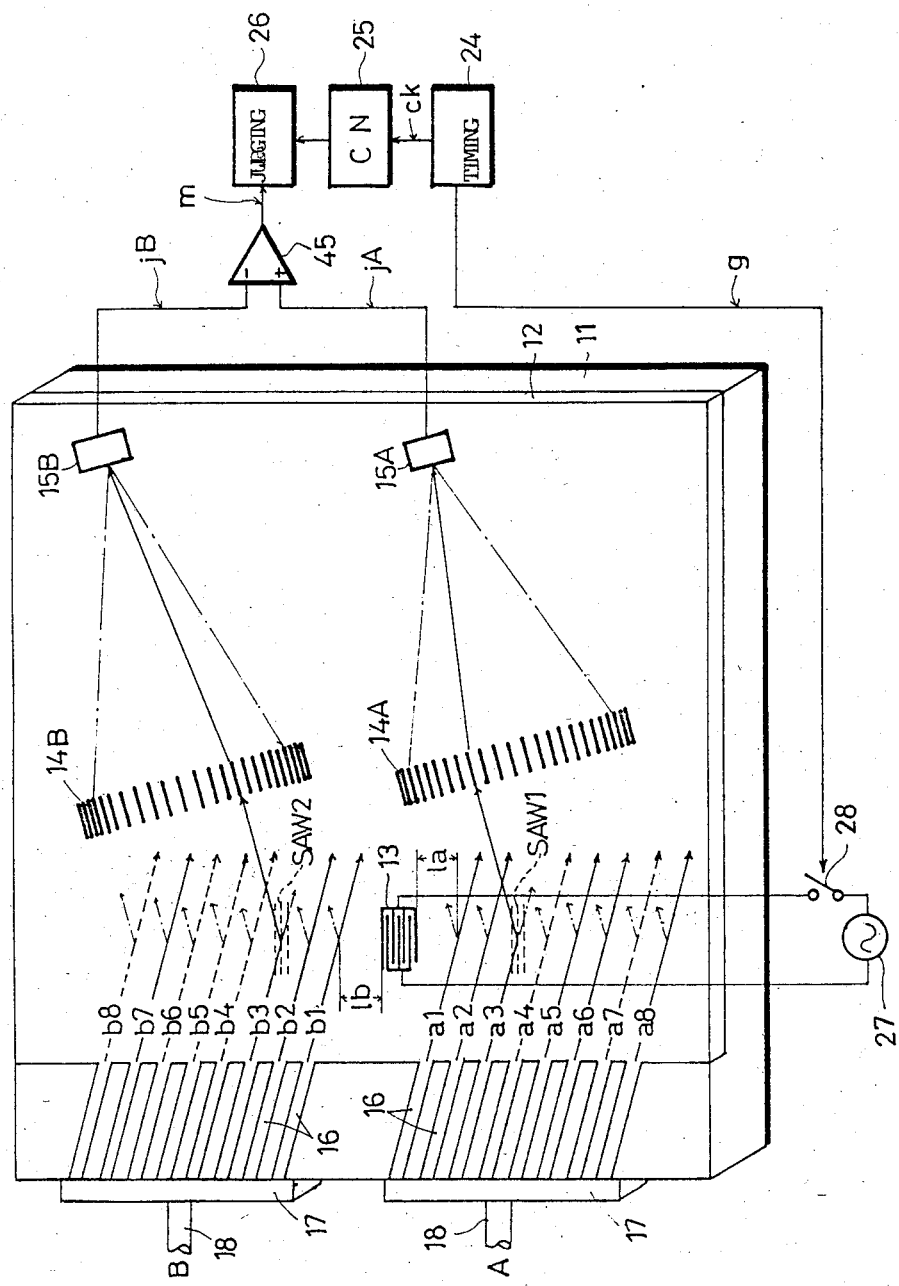
FIG. 9 is an elevated view in perspective of another embodiment of an optical comparator in accordance with the invention.
Figure 10:
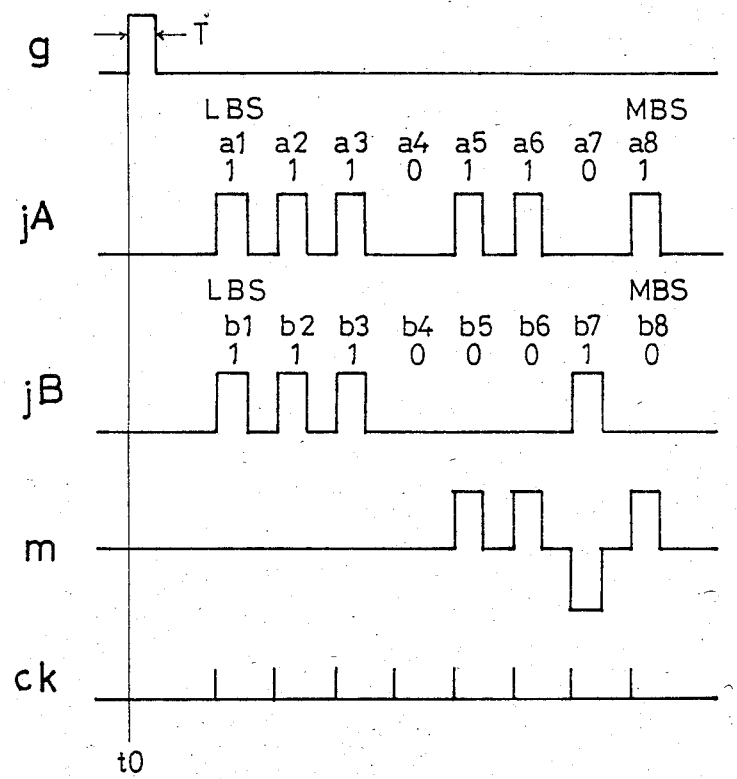
FIG. 10 is a timing diagram of signals produced by the comparator shown in FIG. 9.

FIGS. 9 and 10 show another embodiment, in which the diffracted beams of optical digital signals A and B are converged on and detected by photosensors 15A and 15B via lenses 14A and 14B individually for the signals A and B. The outputs jA, jB of the sensors 15A, 15B are fed to a differential amplifier 45, which detects the difference therebetween. When the optical bit signals ai and bi to be compared with one another and included in the signals A and B represent the same values, the output signal m of the differential amplifier 45 is at 0 level, but when the signals ai and bi represent different values, a pulse of level 1 or −1 appears in the signal m. A judging circuit 26 detects the pulse of level 1 or −1 and, with reference to the output of a counter 25, recognizes the bit position of the signals which do not match.

FIG. 11 shows another embodiment which has the same construction as the one shown in FIG. 5 with the exception of the signal g for controlling the switch 28. First, the switch 28 is turned on at time t0 and is held on for a period of time T only, causing a SAW 1 to propagate toward the path of propagation of optical signals A and B. Upon the lapse of time L/VS after time t0, the switch 28 is turned on again only for a period of time T to generate a SAW 2. The two SAW's 1 and 2 propagate as spaced apart by a distance L to successively diffract the beams ai and bi. The distance L is made equal to 8·lo. Accordingly the beams ai and bi are diffracted by the SAW 1 and SAW 2 respectively at the same time. The corresponding bits of the optical signals A and B are compared for a period of time following the diffraction of the beams a1 and b1 upon the lapse of time (L+La)/VS after time t0 until a period of time 8·lo/VS thereafter elapses. The signal j sent out from the sensor 15 during this period of comparison operation is exactly the same as the one shown in FIG. 8, so that the bit signals not matching can be detected exactly in the same manner. The arrangement shown in FIG. 11 can of course be so modified that the diffracted light of the signal A is detected independently of the detection of the diffracted light of the signal B to calculate the difference between the resulting outputs.

The embodiment of FIG. 11 also has the advantage that the position of the optical waveguide paths 16 relative to the IDT 13, i.e., the distance La, can be set as desired. With the embodiments of FIGS. 7 and 9 also, the distances la and lb can be made equal with high accuracy by the method shown in FIG. 3 or 4.

What is claimed is:

1. An optical comparator for comparing two optical digital signals comprising:
    optical waveguide means, including an acousto-optical material, for propagating light therethrough;
    means for coupling first and second optical digital signals to said waveguide means, said first and second signals each comprising plural optical bits, a one-to-one correspondence existing between the plural bits of said first signal and the plural bits of said second signal;
    surface acoustic wave generator means for generating surface acoustic waves and for propagating said waves through the optical waveguide means to impinge upon said first and second signals propagating through said waveguide means at the Bragg angle; and
    means for detecting the bits of said first signal which have been diffracted or the undiffracted bits of said first signal and for detecting the bits of said second signal which have been diffracted or the bits of said second signal which have not been diffracted,
    wherein the initiation or cessation of interaction between a surface wave produced by said surface acoustic wave generator means and any given one of the plural optical bits of said first signal is simultaneous with initiation or cessation of the interaction of the surface acoustic wave with a corresponding bit of the second optical signal.

2. An optical comparator as defined in claim 1 wherein:
    surface acoustic waves produced by said generator means successively interact with the bits of said first signal and successively interact with the bits of said second signal, any bit of said first signal and the bit of said second signal corresponding thereto being diffracted at the same time; and
    said detecting means includes means for detecting the diffracted light of said first optical digital signal and the undiffracted light of the second optical digital signal.

3. An optical comparator as defined in claim 1 wherein:
    surface acoustic waves produced by said generator means successively interact with the bits of said first signal and also successively interact with the bits of said second signal so that each bit of said first signal is diffracted at the same time that a corresponding bit of said second signal is undiffracted; and
    said detecting means includes means for detecting one of the diffracted bits and the undiffracted bits of the first and second optical digital signals.

4. An optical comparator as defined in claim 1 wherein:
    said generator means includes means for generating first and second pulsating surface acoustic waves, said first wave successively interacting with the bits of the first signal at the same time that the second wave interacts with corresponding bits of the second signal; and
    said detecting means includes means for detecting the diffracted bits of each of said first and second optical digital signals.

5. An optical comparator as defined in claim 1 wherein said detecting means includes:
    means for detecting light;
    means for converting the detected light to an electric signal; and
    means for differentiating the electric signal.

6. An optical comparator as in claim 1 wherein said detecting means includes:
    means for detecting light;
    means for converting the detected light to an electric signal; and
    means for comparing the level of the electric signal with a reference level.

7. An optical comparator as defined in claim 1 wherein said detecting means includes:
    a first detector for detecting the diffracted and/or the undiffracted bits of the first optical digital signal; and
    a second detector for detecting the diffracted and/or undiffracted bits of the second optical digital signal.

8. An optical comparator as defined in claim 1 wherein the surface acoustic wave generator means is disposed on the optical waveguide means between the path of propagation of the first optical digital signal and the path of propagation of the second optical digital signal.

9. An optical comparator as defined in claim 1 wherein the surface acoustic wave generator means is disposed on said waveguide means, and said coupling means propagates said first and second optical signals through said waveguide means along first and second propagation paths respectively, said second path disposed between said first path and said generator means.

10. An interdigital transducer for generating a surface acoustic wave propagating through an optical waveguide to selectively diffract light propagating through said waveguide, comprising a plurality of substantially parallel electrodes and first and second common electrodes, alternate electrodes being connected to the same one of the first and second common electrodes, at least one parallel electrode positioned at at least one end of the transducer being unconnected to said common electrodes, the number of said unconnected parallel electrodes determined in accordance with the position of the transducer with respect to light propagating through said waveguide.

11. A method of comparing two optical digital signals comprising:
    coupling first and second optical digital signals to an optical waveguide means, said waveguide means for propagating light therethrough, said first and second signals each comprising plural optical bits, the plural bits of said first signal having a one-to-one correspondence with the plural bits of said second signal;

propagating first and second surface acoustic waves through said waveguide means, said first wave successively interacting with the bits of said first signal, said second signal successively interacting with the bits of said second signal, the initiation or cessation of interaction between said first wave and any givenbit of said first optical signal being simultaneous with the initiation of cessation of interaction between said second wave and the bit of said second optical signal corresponding to the given bit of said first optical signal; and detecting a variation produced by the interaction between said first and second signals and said first and second waves.

12. A method of adjusting the effective position of an interdigital transducer of the type comprising a plurality of parallel electrodes and first and second common electrodes, alternate ones of the parallel electrodes of the transducer having at least one end connected to the first common electrode, the ones of the parallel electrodes not connected to said first common electrode being connected to the second common electrode, the method comprising disconnecting a selected number of said parallel electrodes disposed at at least one end of the transducer from the first and second common electrodes originally connected thereto, and selecting the number of said parallel electrodes being disconnected by said disconnecting step in accordance with the position of the transducer with respect to a light beam to be diffracted.

13. An apparatus for comparing first and second optical digital values comprising:

optical waveguide means for propagating light therethrough;

first transmitting means for transmitting a first optical signal comprising a first plurality of light beams over plural mutually-parallel beam paths $A_1-A_n$ through said waveguide means;

second transmitting means for transmitting a second optical signal comprising a second plurality of light beams over plural mutually-parallel beam paths $B_1-B_n$ through said waveguide means, said beams travelling over said paths $B_1-B_n$ having a one-to-one correspondence with said beams of said first optical signal travelling over said paths $A_1-A_n$;

means for propagating a first acoustic wavefront through said waveguide means and for causing said first wavefront to successively impinge upon said paths $A_1-A_n$ and for simultaneously propagating a second acoustic wavefront through said waveguide means and for causing said second wavefront to successively impinge upon said paths $B_1-B_n$, said second wavefront impinging or ceasing to impinge upon each path $B_i$ of said plural paths $B_1-B_n$ at the same time said first wavefront impinges or ceases to impinge upon the path $A_i$ of said paths $A_1-A_n$, the beam of said first signal travelling over said path $A_i$ corresponding to the beam of said second signal travelling over said path $B_i$; and comparing means for comparing the intensity of (a) the beams of said first signal diffracted by said first wavefront or (b) the beams of said first signal undiffracted by said first wavefront with the intensity of (c) the beams of said second signal diffracted by said second wavefront or (d) the beams of said second signal undiffracted by said second wavefront.

14. An apparatus as in claim 13 wherein said comparing means includes means for comparing the intensity of the beams of said first signal diffracted by said first wavefront with the intensity of the beams of said second signal undiffracted by said second wavefront.

15. An apparatus as in claim 13 wherein said comparing means includes means for comparing the intensity of the beams of said first signal diffracted by said first wavefront with the intensity of the beams of said second signal diffracted by said second wavefront.

16. An apparatus as in claim 13 wherein said propagating means includes transducer means, disposed on said waveguide means between the paths $A_1-A_n$ and the paths $B_1-B_n$, for directing said first wavefront in a first direction along a line toward the propagation paths $A_1-A_n$ and for directing said second wavefront in a second direction opposite to said first direction along said line toward the propagation paths $B_1-B_n$.

17. An apparatus as in claim 16 wherein:

said transducer means includes a first end portion for producing said first wavefront and a second end portion for producing said second wavefront; and the distance along said line from said first end portion of said transducer means to any path $A_i$ of said plural paths $A_1-A_n$ is equal to the distance along said line from said second end portion of said transducer means to the path $B_i$ of said plural paths $B_1-B_n$ over which travels the beam of said second signal corresponding to the beam of said first signal travelling over said path $A_1$.

18. An apparatus as in claim 13 wherein:

said paths $A_1-A_n$ are adjacent and parallel to the paths $B_1-B_n$; and said propagating means includes means for directing said first wavefront along an acoustical wavefront path toward said mutually-parallel paths $A_1-A_n$, $B_1-B_n$, and for thereafter directing said second wavefront along the same acoustic wavefront path.

19. An apparatus as in claim 18 wherein:

said first transmitting means transmits said plural first signal beams along respective plural mutually-parallel paths $A_1-A_n$, each of said plural paths $A_1-A_n$ being spaced from the paths adjacent thereto by the same predetermined distance;

said second transmitting means transmits said plural second signal beams along respective plural mutually-parallel paths $B_1-B_n$, each of said plural paths $B_1-B_n$ being spaced the same predetermined distance from paths adjacent thereto; and the path $B_1$ is parallel and adjacent to the path $A_n$ and is spaced therefrom by said same predetermined distance.

20. An apparatus as in claim 19 further including timing means for controlling said transducer means to transmit said second wavefront a predetermined time after said transducer means transmits said first wavefront, said predetermined time equal to the difference between the time said first wavefront impinges said path $A_1$ and the time said wavefront impinges said path $B_1$.

21. An apparatus as in claim 13 wherein said comparing means includes;

detecting means for converting light to an electrical signal;

collimating means for directing one of (a) the beams of said first signal diffracted by said first wavefront and (b) the beams of said first signal undiffracted by said first wavefront and one of (c) the beams of said second signal diffracted by said second wavefront and (d) the beams of said second signal undiffracted by said second wavefront toward said detecting means;

means for differentiating said electrical signal produced by said detecting means; and means for detecting changes in said differentiated electrical signal.

22. A method for comparing first and second optical digital values comprising the steps of:

(1) transmitting a first optical signal comprising plural beams of light through an optical waveguide over plural mutually-parallel paths $A_1$–$A_n$;

(2) transmitting a second optical signal comprising plural beams of light through said waveguide over plural mutually-parallel paths $B_1$–$B_n$, said beams travelling over said paths $B_1$–$B_n$ having a one-to-one correspondence with said beams travelling over said paths $A_1$–$A_n$;

(3) propagating a first acoustic wavefront through said waveguide to successively impinge upon said paths $A_1$–$A_n$;

(4) propagating a second acoustic wavefront through said waveguide to successively impinge upon said paths $B_1$–$B_n$, said second wavefront impinging upon each path $B_i$ of said paths $B_1$–$B_n$ at the same time said first wavefront impinges upon a path $A_i$ of said paths $A_1$–$A_n$, the beam of said first signal travelling over said path $A_i$ corresponding to the beam of said second signal travelling over said path $B_i$;

(5) successively diffracting, with said first wavefront, beams of said first signal as said first wavefront impinges upon said paths $A_1$–$A_n$ during said propagating step (3);

(6) successively diffracting, with said second wavefront, the beams of said second signal as said second wavefront impinges upon said paths $B_1$–$B_n$ during said propagating step (4); and (7) comparing the intensity of (a) the beams of said first signal diffracted by said diffracting step (5) or (b) the beams undiffracted by said diffracting step (5) with the intensity of (c) the beams diffracted by said diffracting step (6) or (d) the beams undiffracted by said diffracting step (6).

23. A method as in claim 22 wherein said comparing step (7) includes the step of comparing the intensity of the beams of said first signal diffracted by said diffracting step (5) with the intensity of the beams of said second signal not diffracted by said diffracting step (6).

24. A method as in claim 23 wherein said comparing step (7) includes the steps of:

directing one of (a) the beams of said first signal diffracted by said diffracting step (5) and (b) the beams of said first signal not diffracted by said diffracting step (5) and one of (c) the beams of said second signal diffracted by said diffracting step (6) and (d) the beams of said second signal not diffracted by said diffracting step (6) toward a detection area;

converting the light impinging upon said detection area to an electrical signal;

differentiating said electrical signal produced by said converting step; and detecting changes in said differentiated electrical signal.

25. A method as in claim 22 wherein said comparing step (7) includes the step of comparing the intensity of the beams of said first signal diffracted by said diffracting step (5) with the intensity of the beams of said second signal diffracted by said diffracting step (6).

26. A method as in claim 22 wherein:

said propagating step (3) includes the steps of:
producing said first acoustic wavefront with a transducer disposed on said waveguide between the paths $A_1$–$A_n$ and the paths $B_1$–$B_n$, and
directing said first wavefront in a first direction along a line toward the propagation paths $A_1$–$A_n$; and said propagating step (4) includes the steps of:
producing said second acoustic wavefront with said transducer, and
directing said second wavefront in a second direction opposite to said first direction along said line toward the propagation paths $B_1$–$B_n$.

27. A method as in claim 26 wherein:

said first wavefront directing step includes the step of propagating said first wavefront along said line from a first end portion of said transducer to a path $A_i$ of said plural paths $A_1$–$A_n$ over a first distance; and said second wavefront directing step includes the step of propagating said second wavefront from a second end portion of said transducer along said line over a second distance to the path $B_i$ of said plural paths $B_1$–$B_n$ over which travels the beam of said second signal corresponding to the beam of said first signal travelling over said path $A_i$, said first distance equal to said second distance.

28. A method as in claim 22 wherein:

said transmitting step (2) transmits said plural beams of said second optical signal along plural mutually-parallel paths $B_1$–$B_n$ which are also mutually-parallel to said plural mutually-parallel paths $A_1$–$A_n$, said paths $B_1$–$B_n$ adjacent to said paths $A_1$–$A_n$;

said propagating step (3) includes the step of directing said first wavefront along an acoustical wavefront path at a first instant in time toward said mutually-parallel paths $A_1$–$A_n$, $B_1$–$B_n$; and said propagating step (4) includes the step of propagating said second wavefront along the same acoustic wavefront path at a second instant in time later than said first instant toward said mutually-parallel paths $A_1$–$A_n$, $B_1$–$B_n$.

29. A method as in claim 28 wherein:

said transmitting step (1) transmits said plural first signal beams along respective plural mutually-parallel paths $A_1$–$A_n$, each of said plural paths $A_1$–$A_n$ being spaced from the paths adjacent thereto by the same predetermiend distance;

said transmitting step (2) includes the step of transmitting said plural second signal beams along respective plural mutually-parallel paths $B_1$–$B_n$, each of said plural paths $B_1$–$B_n$ being spaced the same predetermined distance from the paths adjacent thereto, the path $B_1$ parallel and adjacent to the path $A_n$ and spaced therefrom by said same predetermined distance.

30. A method as in claim 29 further including the steps of:

timing a time interval beginning at said first instant of time;

comparing the duration of said timed interval with a predetermined duration related to the difference between the time said first wavefront impinges said path $A_1$ and the time said second wavefront impinges said path $B_1$; and said propagating step (4) includes the step of propagating said second wavefront after said comparing step determines said predetermined duration has elapsed.

31. A method of forming an interdigital transducer comprising the steps of:
(1) photolithographically forming a conductive pattern on a substrate, said pattern comprising a plurality of parallel elongated electrodes and first and second common electrodes, alternate ones of the elongated electrodes of the transducer having at least one end connected to the first common electrode, the ones of the elongated electrodes not connected to the first common electrode being connected to the second common electrode;
(2) applying an alternating electrical signal to said pattern to thereby propagate first and second acoustic wavefronts therefrom through said substrate;
(3) measuring the difference between the time said first wavefront diffracts a first light beam propagating through said substrate and the time said second wavefront diffracts a second light beam propagating through said substrate;
(4) disconnecting an elongated electrode of said pattern from the one of the first and second common electrodes originally connected thereto; and
(5) repeating said applying step (2), said determining step (3) and said disconnecting step (4) until said determining step (3) determines said first and second beams are diffracted simultaneously.

* * * * *